United States Patent [19]

Axthammer

[11] 4,441,593
[45] Apr. 10, 1984

[54] VIBRATION DAMPER ARRANGEMENT FOR VEHICLES

[75] Inventor: Ludwig Axthammer, Hambach, Fed. Rep. of Germany

[73] Assignee: Fichtel & Sachs AG, Fed. Rep. of Germany

[21] Appl. No.: 446,989

[22] Filed: Dec. 6, 1982

Related U.S. Application Data

[63] Continuation of Ser. No. 176,698, Aug. 11, 1980, abandoned.

[30] Foreign Application Priority Data

Aug. 28, 1979 [DE] Fed. Rep. of Germany ....... 2934671

[51] Int. Cl.³ ............................................ B60G 15/06
[52] U.S. Cl. ......................... 188/322.11; 188/322.19; 267/8 R; 267/64.15; 267/66; 280/668
[58] Field of Search ................. 267/8 R, 64.15, 64.26, 267/64.11, 33, 34, 60, 61, 66–68; 188/322.12, 322.16–322.19, 322.11, 269, 311, 312, 321.11, 322.22, 322.21; 280/670, 668; 92/148, 161, 161.5

[56] References Cited

U.S. PATENT DOCUMENTS

| | | | |
|---|---|---|---|
| 3,346,272 | 10/1967 | Smith | 280/668 |
| 3,603,574 | 9/1971 | Lutz | 267/34 |
| 3,811,664 | 5/1974 | Spinks | 267/66 |
| 3,880,412 | 4/1975 | Nicholls | 267/67 |
| 4,256,292 | 3/1981 | Sullivan, Jr. et al. | 267/8 R |
| 4,321,988 | 3/1982 | Bich | 188/322.11 |

FOREIGN PATENT DOCUMENTS

| | | | |
|---|---|---|---|
| 23967 | 2/1981 | European Pat. Off. | |
| 1630772 | 2/1971 | Fed. Rep. of Germany | |
| 2221284 | 11/1973 | Fed. Rep. of Germany | |
| 2514456 | 10/1976 | Fed. Rep. of Germany | 280/668 |
| 2656707 | 6/1978 | Fed. Rep. of Germany | 280/668 |
| 1516413 | 1/1968 | France | |
| 1529049 | 5/1968 | France | |
| 1539584 | 8/1968 | France | |
| 2403492 | 4/1979 | France | |
| 2444578 | 7/1980 | France | |
| 1296722 | 11/1972 | United Kingdom | |
| 1356261 | 6/1974 | United Kingdom | |
| 2,030,090 | 4/1980 | United Kingdom | 188/322.11 |

*Primary Examiner*—Douglas C. Butler
*Attorney, Agent, or Firm*—Toren, McGeady and Stanger

[57] ABSTRACT

In a vibration damper arrangement for vehicles, an axially extending vibration damper of the piston rod-cylinder type is mounted in a receptacle in a vibration damper support. The damper includes an axially extending jacket tube which is removably secured in the receptacle by a fastening device attached to one end of the tube. The fastening device exerts a tension force on the damper causing a stop surface on the jacket tube to be biased against another stop surface on the receptacle. At least one of the stop surfaces extends obliquely of the jacket tube axis.

39 Claims, 7 Drawing Figures

VIBRATION DAMPER ARRANGEMENT FOR VEHICLES

This is a continuation of application Ser. No. 176,698 filed on Aug. 11, 1980 now abandoned.

SUMMARY OF THE INVENTION

The invention is directed to a vibration damper arrangement for vehicles and includes a vibration damper of the piston rod-cylinder type and a vibration damper support. A tube forms a part of and extends from one end of the vibration damper. The tube is inserted into a receptacle in the support and is secured in the receptacle by a detachable fastening device which engages one end of the vibration damper.

Vibration damper arrangements, constructed as compression struts, are used for supporting the vehicle axle on a vehicle body and usually the vibration damper support includes a spring plate mounting a helical spring which effects the vehicle suspension. An oppositely disposed vehicle plate is secured on the vehicle body. To damp wheel vibrations, the vibration damper is positioned in a receptacle of the vibration damper support. To replace the vibration damper or absorber in the upward direction, it is known to construct the tubular receptacle of the vibration damper support longer than the tube of the vibration damper so that at the upper end of the tubular receptacle a screw ring can be attached for placing a compressive force on the upper end of the tube. After the screw ring is loosened, the vibration damper or absorber can be pulled quickly out of the receptacle. The inaccessibility of the screw ring, which acts as a fastening device, is disadvantageous because the screw ring is located relatively high up in the wheel housing and, in addition, the helical spring is in the way. Such a connection of the vibration damper to the support requires a support with a long axial dimension so that the entire tube of the damper can be installed in the receptacle with the result that the weight of the arrangement becomes quite great.

In German Auslegeschrift No. 16 30 772, a vibration damper of the above-described type is known in which the vibration damper or absorber takes place in the downward direction. In such an arrangement, a screw cap, having an external thread, at the lower end of the tubular receptacle of the vibration damper support is screwed into a corresponding internal thread. A stop at the upper end of the receptacle acts on the upper end face of the container of the vibration damper formed by the tube. By tightening the screw cap, the container is pressed against the stop and the damper is fastened in the tubular receptacle of the vibration damper support. To remove the vibration damper downwardly is usually very difficult because obstructing components, for instance the wishbone for the wheel control, must be removed. When the vibration dampers wear out and the damping action is no longer effective, these known designs have the disadvantage of the high costs involved in replacing the damper.

It is the primary object of the present invention to provide a vibration damper arrangement for vehicles which permits a problem-free replacement of the vibration damper while affording easy accessibility to the fastening device. To save weight, the arrangement can include a short receptacle for the vibration damper support which is easy to manufacture. Additionally, when transverse force is developed the damper arrangement limits, as much as possible, yielding of the piston rod to assure optimum functioning of the arrangement. Further, if the damper arrangement is used as a compression strut, perfect wheel control is afforded. Accordingly, the vibration damper should be fastened in the receptacle so that it is as free from play as is possible and should deflect occurring transverse forces directly in the vibration damper support. Additionally, it should be possible to replace the vibration damper in a simple, time-saving and low cost manner, independent of the design of the damper itself.

In accordance with the present invention, a fastening device provides a pulling or tension action on one end of the vibration damper directed in the axial direction, that is, from one end to the other, so that a first stop surface on the tube of the damper is biased under the axially directed tensioning action against a second stop surface formed on the receptacle. At least one of these stop surfaces extends obliquely with respect to the axis of the tube.

Due to the tensile stress on the container tube between the first stop surface and one end of the vibration damper and the centering of the tube due to the inclination of the stop surfaces, an excellent connection between the tube and the receptacle of the support is effected with axial and radial movement of the tube relative to the vibration damper support being prevented. To replace the vibration damper by removing it upwardly, it is only necessary to loosen the fastening device at the lower end of the damper and then pull the damper upwardly out of the receptacle in the damper support. Even the vehicle springs do not have to be released for this purpose. Since the fastening device is very accessible, the assembly of the damper can be performed without jacking up the vehicle or placing it on a lift. The placement of the first stop surface can be selected according to the length of the receptacle of the damper support required for guidance of the jacket tube. It is suggested that the first stop surface is positioned from both ends of the tube so that sufficient guidance of the tube is guaranteed and, at the same time, a relatively short and lightweight receptacle can be provided.

In accordance with the present invention, single tube vibration dampers containing the cylinder and piston rod can be used where the tube is formed by the cylinder tube. In addition, double tube vibration dampers or shock absorbers can be employed where the tube is a housing tube laterally encircling the cylinder tube. Furthermore, it is also possible to use a vibration damper in which the piston rod is rigidly connected with a guide tube which encircles the piston rod. In such an arrangement, the guide tube forms the tube.

To limit yielding of the piston rod as much as possible when transverse force is applied, it is advantageous if one or more guide sleeves are provided between the jacket tube and the piston rod cylinder of the damper.

A very simple construction of the vibration damper arrangement embodying the present invention can be achieved if one or more conically shaped projections are provided on the tube distributed around its periphery. Further, the projections on the tube can be in the form of longitudinal beads. In another embodiment, the projections can be formed as basically cylindrical peripheral surfaces. A very lightweight, economical arrangement can be accomplished by providing one or more conical expansions on the tube, distributed over a part of the tube periphery.

For effecting a secure placement of the vibration damper in the support receptacle, the tube is provided with an annular outer conical surface while the receptacle has an inner conical surface with the two surfaces abutting one another.

In damper arrangements where the tube also acts as the cylinder in which the piston slides, it is advantageous if a split cone ring is provided so that it is secured by a stop on the tube so that it cannot slide in the axial direction toward the opposite end of the vibration damper from the end at which the damper is secured.

In one arrangement of the fastening device, for placing the tube under tension in the aixal direction, in accordance with the present invention a contact surface is formed on the tube adjacent one end of the vibration damper. The contact surface extends obliquely of the axis of the tube. At least one tightening screw extending radially of the jacket tube axis engages the contact surface. It is especially practical if the fastening device is formed by a screw connection between one end of the vibration damper and the receptacle.

In an especially advantageous embodiment of the invention, a steering knuckle is provided at the vibration damper support; in addition, for use as a compression strut, a compression spring, winding around at least part of the length of the vibration damper, can be provided.

The various features of novelty which characterize the invention are pointed out with particularly in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
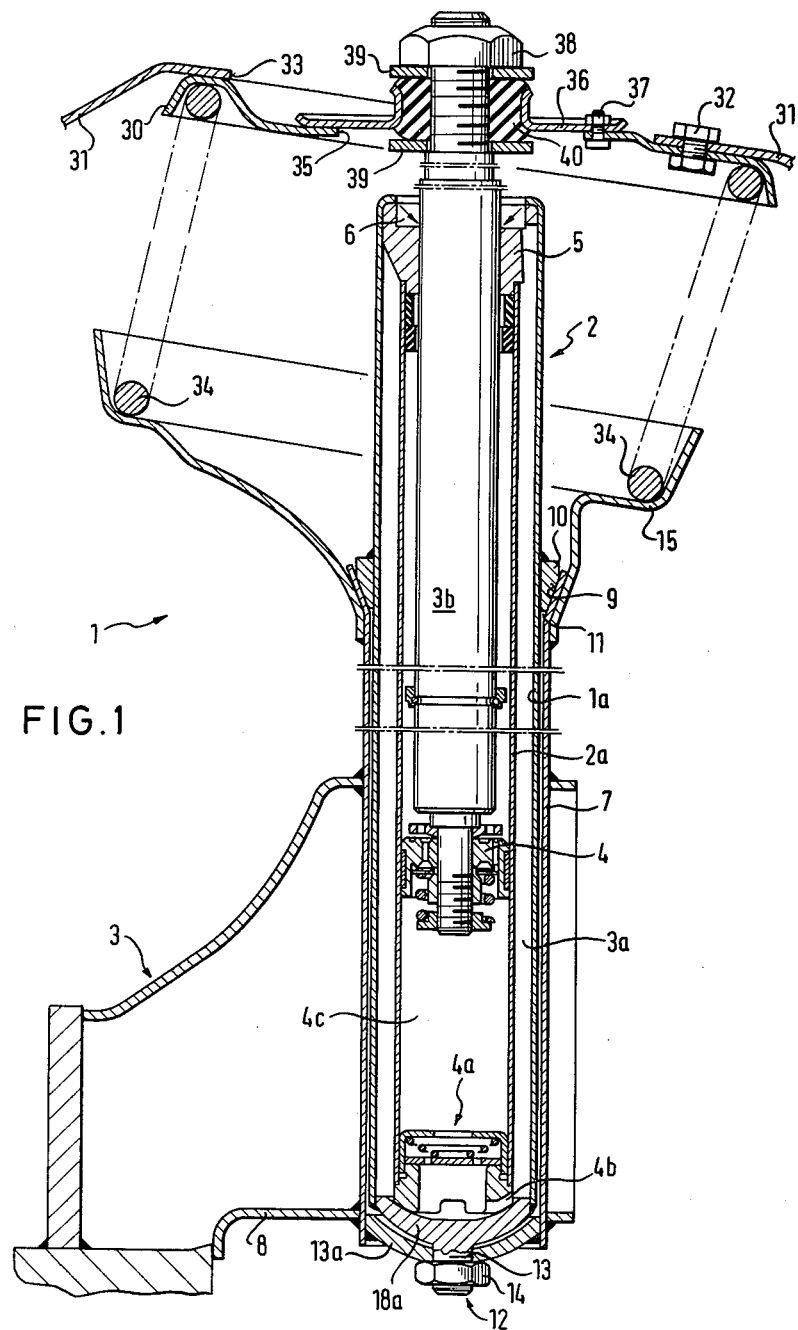
FIG. 1 is a sectional view through a compression strut illustrating a double tube vibration damper embodying the present invention.

In FIG. 1, a compression strut 1 is shown in axial section and is utilized as the front wheel suspension for a front end drive vehicle. The compression strut 1 includes, as a vibration damper, a dual tube vibration damper 2 having an outer tube 1a and an inner or cylinder tube 2a. Outer tube 1a and cylinder tube 2a combine to form an annular compensating space 3a between them. A piston rod 3b with a piston 4 mounted at its lower end slides within the cylinder tube 2a. At the piston outlet end of the outer tube 1a, that is the upper end in FIG. 1, there is a piston rod guide 5 and a piston rod seal 6. Piston 4 is formed as a damping piston. A damping unit 4a is located at the bottom of the cylinder tube 2a and controls the flow by means of a connection 4b between the compensating space 3a located around the cylinder tube and an operating space 4c located within the cylinder tube between the piston 4 and the damping unit 4a.

The dual tube vibration damper 2 is fitted into a tubular receptacle 7 forming a part of a vibration damper support 3. Vibration damper support 3 is constructed with a pivot bearing 8 which, for instance, can be pressed from sheet metal and is rigidly secured to the receptacle 7. At the pivot bearing 8 there is a bushing, not shown, through which a drive shaft is guided and supported. The lower end of the pivot bearing 8, also not shown, is of a fork-shaped construction and is provided with a bore for receiving a fastening screw for attaching a ball pin. The upper end of tubular receptacle 7 terminates in the region of a spring plate 15 which is attached to the receptacle. At its upper end the receptacle 7 is conically expanded and forms an inner conical surface 11. Outer tube 1a has a cone ring 10 secured to it. Inner conical surface 11 is in a plane 9 inclined obliquely of the axis of the damper 2. The inclined plane corresponds to the plane of the outer surface of the conical ring 10. The receptacle 7 is of a relatively short axial length so that the conical ring 10, located at some distance from the piston rod outlet end of the tube 1a, is secured on the outer cylindrical surface of the tube 1a. For the connection of the double tube vibration damper 2 with the receptacle 7, on which the spring place 15 is secured, a threaded stem 13 is attached to the bottom 18a of the tube 1a and extends through a bore in a cover plate 13a fixed to the lower end of the receptacle 7. A fastening device 12 is formed by a nut 14 screwed onto the threaded stem 13. When the nut 14 is tightened onto the threaded stem 13, an axially directed tension force is applied to the tube 1a with the conical ring 10 being pulled downwardly into contact with the obliquely extending planar surface 9 of the inner conical surface 11 at the upper end of the receptacle 7.

In the upper part of FIG. 1 it is roughly indicated how the upper end of the compression strut 1 is connected with the body of the vehicle. Spaced upwardly from and opposite spring plate 15 is a second spring plate 30 attached to a part of the vehicle body by bolts 32, one of which is shown in FIG. 1. The second or upper spring plate 30 extends at least partially across an opening 33 in the vehicle body. Compression spring 34 is clamped between the two spring plates 15, 30. To afford free twisting of the compression spring under stress, one of the spring plates 15, 30 can be rotatably supported. Upper spring plate 30 has a central opening 35 having a diameter not significantly larger than the largest diameter of the double tube vibration damper 2. In the assembled compression strut 1, opening 35 is covered by a flange 36 secured around its radially outer edge to the upper spring plate 30 by bolts 37 and around its radially inner edge by an elastic coupling with the upper or free end of piston rod 3b. The elastic coupling is formed by an approximately toroidal rubber element 40 fixed to the flange 36 and pushed onto the upper end of piston rod 3b. Rubber element 40 is clamped on the piston rod between two washers 39 by means of a nut 38.

The double tube vibration damper 2 can, as described below, be replaced quickly and easily. The fastening device 12 is loosened by removing the easily accessible nut 14 at the lower end of the receptacle 7. In addition, flange 36 must be disassembled by loosening the bolt connections 37 from the upper spring plate 30. The double tube vibration damper 2 is now ready to be pulled upwardly out of the receptacle 7. The vehicle body 31 maintains its position with respect to the vibration damper support 3 because the vehicle body is supported, as before, by the compression spring 34 on the vibration damper support 3. Accordingly, jacking up the vehicle or supporting the vehicle on a lift is unnecessary. To install a new vibration damper, it can be inserted from the top into the receptacle 7 with its lower end being secured by the nut 14. The flange 36 provided on the upper end of the damper, mounted on the piston rod 3b, is secured by the bolts 37 to the upper spring plate 30.

Figure 2:
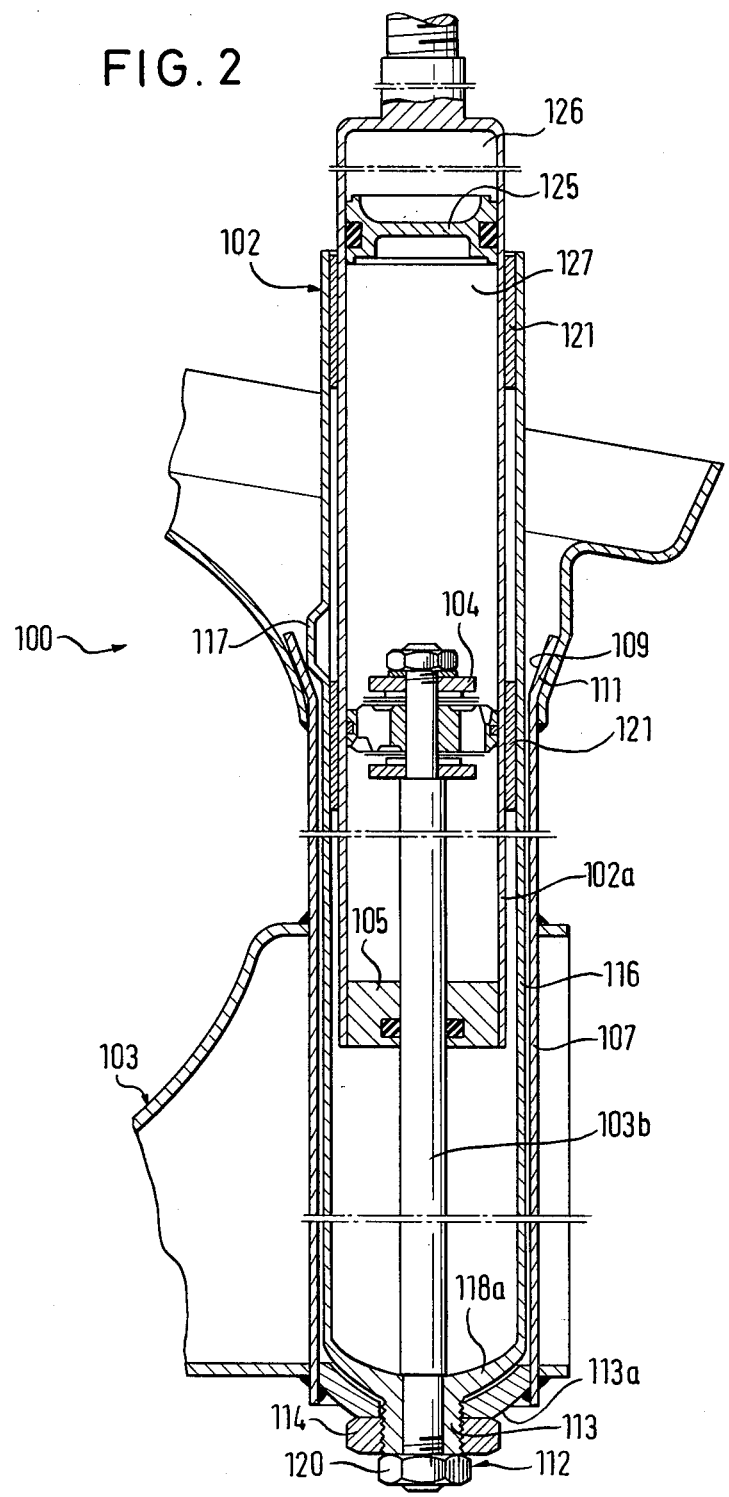
FIG. 2 is a sectional view of the compression strut embodying the present invention, however, displaying a single tube vibration damper with a downwardly emerging piston rod.

Another embodiment of a compression strut 100 is shown in FIG. 2 and the structural elements of the strut corresponding to those shown in FIG. 1 are identified with the same reference numerals, however, with the addition of 100. In this embodiment a single tube vibration damper 102 is inserted into the vibration damper support 103 and the piston rod 103b emerges downwardly out of the damper. Cylinder tube 102a has a piston rod guidance and sealing unit 105 at its lower end. In the upper end of the cylinder tube 102a, an axially slidable separating piston 125 is positioned which separates an upper pressure gas space 126 from a lower pressure liquid space 127. A guide tube 116 fastens the single tube vibration damper 102 in the guidance receptacle 107. Piston rod 103b extends through the bottom 118a of the guide tube 116. As can be seen in FIG. 2, the guide tube 116 is rigidly installed and engages around the piston rod 103b and also around the cylinder tube 102a. Located between the guide tube 116 and the cylinder tube 102a are guide sleeves 121 spaced axially apart for affording optimum guidance of the cylinder tube 102a in the guide tube 116.

The upper end of receptacle 107 is flared outwardly forming an inner conical surface 111 defining an inclined planar surface 109 extending obliquely of the axial direction of said vibration damper 102. In the region of the inner conical surface 111, guide tube 116 has angularly spaced radially outwardly projecting and axially extending beads 117. The radially outer surfaces of the beads are basically cylindrically shaped.

Fastening of the single tube vibration damper 102 and the receptacle 107 is effected over the axially threaded stem 113 located at the bottom 118a of the guide tube 116. The threaded stem is guided through a bore in the cover plate 113a of the guidance receptacle 107. Nut 114 is threaded on the stem. When the nut 114 is tightened, the longitudinal beads 117 slide on the inclined planar surface 109 at the upper inner portion of the guidance receptacle 107 and the single tube vibration damper 102 is optimally fixed in the receptacle. In this embodiment, piston rod 103b is fastened by a piston rod fastening nut 120 at the lower end of the guide tube 116. It would be appreciated that other types of fastenings would also be possible.

Figure 3:
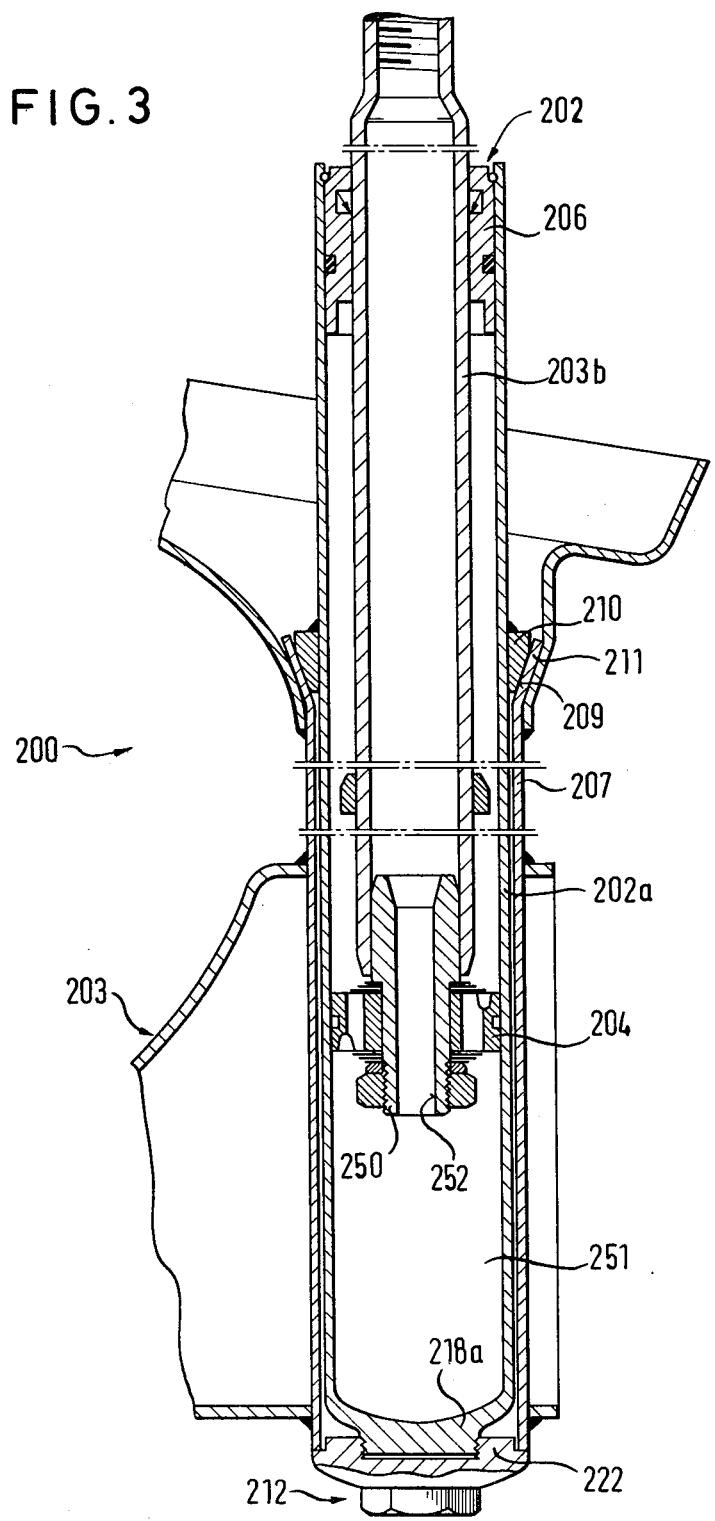
FIG. 3 is a compression strut having a vibration damper embodying the present invention with a pressure medium feed through a hollow piston rod.

In FIG. 3 another embodiment of a compression strut 200 is illustrated where the structural elements corresponding to those in FIG. 1 are identified with the same reference numerals, however, with the addition of 200. Compression strut 200 differs from compression strut 1 in that instead of the double tube vibration damper 2, a single tube vibration damper 202 is shown with an upwardly extending rod 203b with the piston rod being of a tubular construction. A stud 250 provides the attachment of the piston 204 to the lower end of the piston rod 203b. Stud 250 has a central bore 252 so that the inner space 251 of the cylinder below the piston is connected in a simple manner via the hollow piston rod 203b with an equalizing container located exteriorly of the damper and not shown. Tubular receptacle 207 of the vibration damper support 203 is engaged around cylinder tube 202a of the vibration damper 202, and, as in all of the illustrated embodiments, the axial length of the receptacle is less than the axial length of the damper tube positioned in the receptacle. The attachment of the vibration damper 202 differs from that according to FIG. 1 basically in that a screw cap 222, provided with an internal thread, interengages with a corresponding external thread at the bottom 218a of the cylinder tube 202a. When the screw cap 222 is threaded on, its outer shoulder is supported against the lower end of receptacle 207 and pulls or tensions the cylinder tube 202a downwardly so that at the same time the conically shape ring 210, fixed on the cylinder tube 202a, is pulled by the inclined planar surface 209 onto the inner conical surface 211 with a perfect securement of the single tube vibration damper 202 in the receptacle 207.

Figure 4:
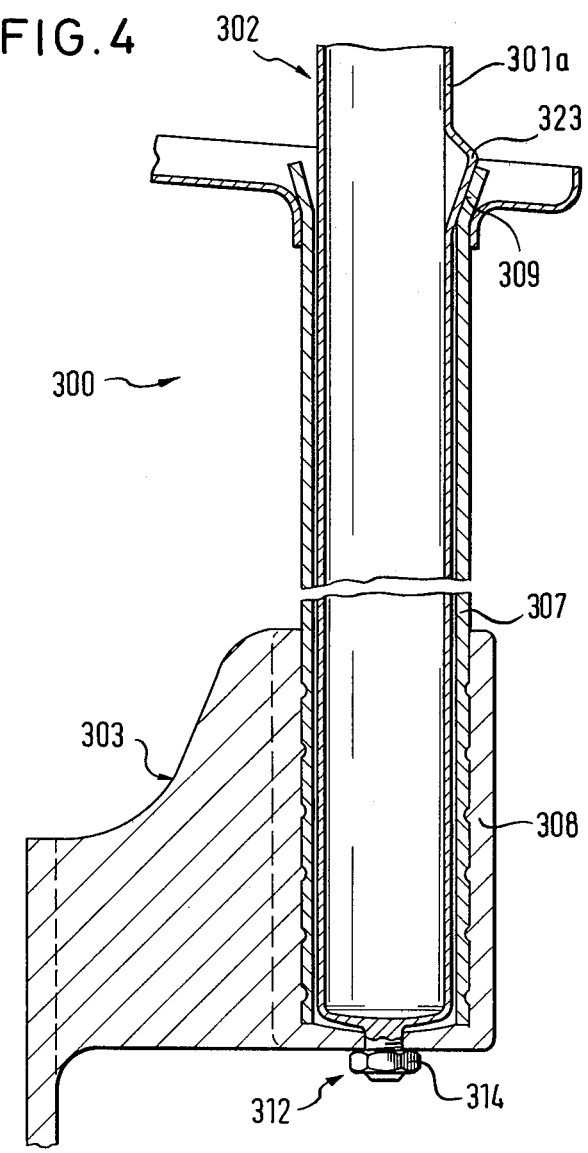
FIG. 4 is a sectional view of a compression strut illustrating a tubular receptacle cast in a pivot bearing.

In FIG. 4 yet another vibration damper arrangement 300 is disclosed having structural elements similar to those in FIG. 1 identified with the same reference numerals, however, with the addition of 300. Pivot bearing 308 is constructed as a casting with the tubular guidance receptacle 307 being cast within the pivot bearing. Tube 301a which can be the jacket tube of a double tube vibration damper or the cylinder or guide tube of a single tube vibration damper, is provided with at least one outwardly extending projection 323 which extends around a limited portion of the periphery of the tube 301a. When the nut 314 is tightened due to the tensioning action developed, the projection 323 contacts the inclined planar surface 309 defined by the inner wall surface at the upper end of the guidance receptacle 307.

Figure 5:
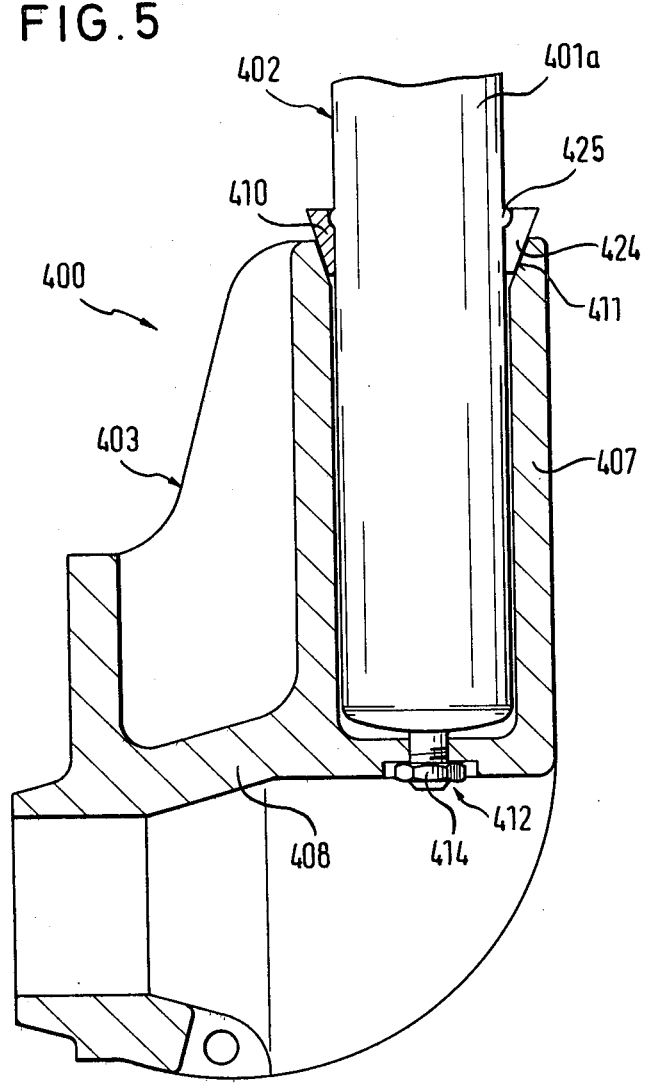
FIG. 5 is a sectional view similar to that shown in FIG. 4, however, the receptacle is cast as a unit with the pivot bearing.

In FIG. 5 still another vibration damper arrangement 400 is exhibited having structural elements corresponding to those in FIG. 1 identified with the same reference numerals, but with the addition of 400. Pivot bearing 408 and the guidance receptacle 407 are formed as a single casting. At the upper end of receptacle 407 in FIG. 5 there is an inner conical surface 411 on which a conically shaped ring 410 bears. Several cams 425 are distributed around the periphery of tube 401a and these cams interengage corresponding surfaces in the conically shaped ring 410 fixing the ring in the axial direction. Conically shaped ring 410 is provided with an axially extending slot 424. Due to this slot 424, while the fastening nut 414 is being tightened onto the lower end of the vibration damper 402, a radial force is exerted by the ring 410 on the tube 401a which improves the attachment of the ring on the tube.

Figure 6:
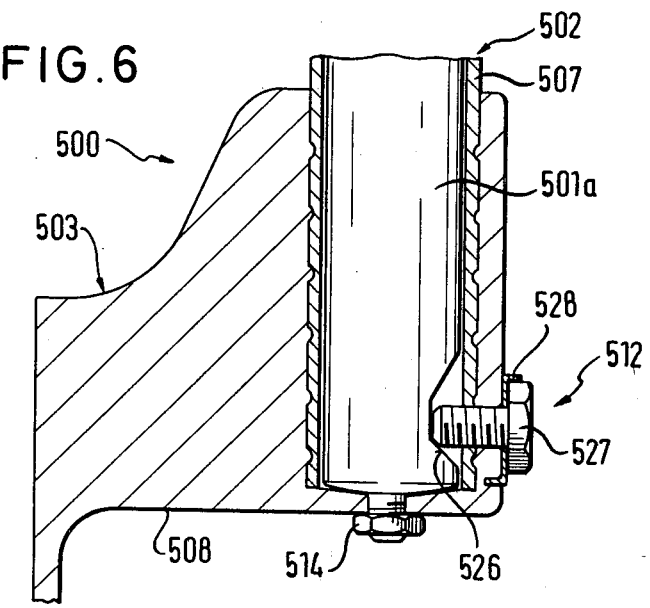
FIG. 6 is a sectional view illustrating the fastening of a vibration damper by means of a radially arranged tightening screw.

In FIG. 6 a further embodiment of a vibration damper arrangement 500 is shown with the structural elements corresponding to those in FIG. 1 being identified with the same reference numerals, however, with the addition of 500. Similar to the embodiment shown in FIG. 4, pivot bearing 508 is formed as a casting into which the tubular receptacle 507 is cast. The upper part of the receptacle 507, not shown, has an inner conical surface. The fastening of the tube 501a within the receptacle 507 is effected by a tightening screw 527 arranged radially relative to the axis of the vibration damper 502. Screw 527 engages against a bevelled or sloping surface 526 formed in the lower region of the tube 501a of the vibration damper 502, not shown in further detail. As can be seen in FIG. 6, bevelled surface 526 is inclined relative to the axis of the vibration damper 502 so that during tightening of the screw 527 the tube 501a is pressed downwardly. A safety clamp 528 prevents any unintentional loosening of the screw 527. Nut 514, as shown in FIG. 6, serves as an additional safety means and may be omitted.

Figure 7:
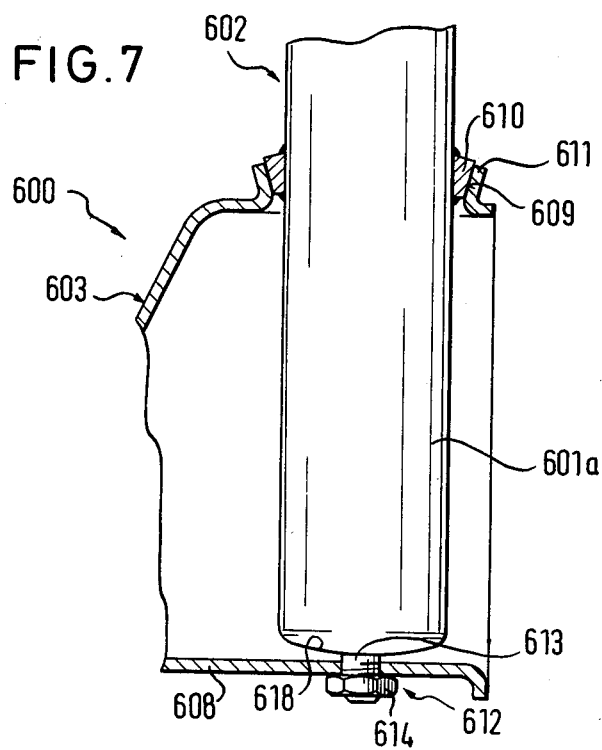
FIG. 7 is a sectional view displaying a pivot bearing, pressed from sheet metal, arranged as a guide for a vibration damper.

In FIG. 7 an embodiment of a vibration damper arrangement 600 is displayed with the structural elements corresponding to those in FIG. 1 being identified with the same reference numerals with the further addition of 600. A pivot bearing 608 is shown constructed so that in its upper surface it forms an inner cone 611. In the lower portion of the pivot bearing 608 a bore is provided through which the threaded stem 613 extends from the bottom 618 of the vibration damper tube 601a. When the nut 614 is threaded onto the stem 613, tube 601a is pulled by the conically shaped ring 610 fixed to the tube via the inclined planar surface 609 into the inner cone 611 so that an optimum fastening is attained. Vibration damper arrangement 600 differs from the other embodiments shown in FIGS. 1 to 6 in that the receptacle is not a tubular member, but rather is formed by the two passage openings in the pivot bearing 608 which are arranged spaced axially apart from one another. Accordingly, the pivot bearing can be constructed by pressing it from sheet metal.

The vibration damper arrangement illustrated in FIGS. 1 to 7 and described above is distinguished in that the vibration damper can be quickly and easily exchanged, as was explained regarding the vibration damper arrangment shown in FIG. 1. Vibration damper arrangements have a limited (without springs) mass because the receptacle is always shorter than the enclosing jacket tube of the vibration damper. In the compression struts shown in FIGS. 1 to 4 the receptacle ends in the region where the lower spring plate is attached to the receptacle. Accordingly, the length of the receptacle is especially dependent on the axial length of the compression spring 34 and preferably is one-half to one-third of the length of the fitted jacket of the vibration damper. In the vibration damper arrangements shown in FIGS. 5 to 7, it is important that the receptacle guides the fitted jacket tube of the vibration damper sufficiently and is in the position to absorb the occurring pitching moments without deforming istelf or without deformation of the jacket tube. A length of the receptacle of approximately one-third of the length of the jacket tube has proven to be especially advantageous.

While specific embodiments of the invention have been shown and described in detail to illustrate the application of the inventive principles, it will be understood that the invention may be embodied otherwise without departing from such principles.

What is claimed is:

1. Vibration damper arrangement for a vehicle comprising an axially extending damper of the piston rod-cylinder type having a pair of opposite ends spaced apart in the axial direction thereof and including a cylindrical tube having the axis thereof extending in the axial direction of said vibration damper, a support for said vibration damper, said support including a hollow cylindrical receptacle having an axis, said tube being insertable into said receptacle with said axis of said tube extending in the axial direction of said receptacle, a detachable fastening device engageable at one end of said damper for securing said damper in said receptacle, wherein the improvement comprises that said fastening device applies a tension force through one end of said vibration damper with the force acting in the axial direction of and applying a tension force to said tube, a first stop surface located on said tube spaced at a distance from both ends of said tube, a second stop surface located on said receptacle remote from said fastening device and in cooperating relation with said first stop surface so that under the applied tension action of said fastening device said first stop surface presses against said second stop surface, at least one of said first and second stop surfaces extends obliquely of the axis of said tube and said receptacle has an open axial end located between and spaced axially from the ends of said tube, said fastening device being located at the other end of said receptacle, whereby when said fastening device is detached, said damper can be removed in its axial direction out of the open end of said receptacle.

2. Vibration damper arrangement, as set forth in claim 1, wherein at least one of said stop surfaces having a conically shaped peripheral surface thereon arranged to engage a peripheral surface on the other said stop surface.

3. Vibration damper arrangement, as set forth in claim 2, wherein said first stop surface includes an annular radially outwardly facing conical surface, and said second stop surface comprises an annular radially inwardly facing conical surface formed complementary to said radially outer conically shaped surface.

4. Vibration damper arrangement, as set forth in claim 2 or 3, wherein said first stop surface comprises a conically shaped ring rigidly secured to said tube.

5. Vibration damper arrangement, as set forth in claim 3, wherein said first stop surface comprises a conically shaped ring mounted on said tube, at least one stop formed on said tube and securing said conically shaped ring thereon for preventing sliding displacement of said conically shaped ring in the axial direction of said vibration damper toward the end thereof opposite said fastening device.

6. Vibration damper arrangement, as set forth in claim 5, wherein said conically shaped ring being slotted in the direction extending in the axial direction of said vibration damper.

7. Vibration damper arrangement, as set forth in claim 1, wherein at least one of said first and second stop surfaces being formed by at least one projection extending from at least a portion of the peripheral surface thereof and arranged to be disposed in contact with the other one of said first and second stop surfaces when a tension force is applied by said fastening device.

8. Vibration damper arrangement, as set forth in claim 7, wherein the surface of said at least one projection contacting the other one of said first and second surfaces being conically shaped.

9. Vibration damper arrangement, as set forth in claim 7 or 8, wherein said at least one projection is formed by displacing the wall of said tube radially outwardly.

10. Vibration damper arrangment, as set forth in claim 9, wherein said at least one projection has an oblong construction in the direction of the axis of said tube and the radially outer surfaces of said projections form a circular arc in section transverse to the axial direction of said tube.

11. Vibration damper arrangement, as set forth in claim 1, wherein said fastening device comprises at least one tightening screw extending radially outwardly relative to the axis of said vibration damper, a contact surface located on the peripheral surface of said tube extending around said axis of said vibration damper and located adjacent one end of said vibration damper, at least a portion of said contact surface extending obliquely relative to the axis of said tube, and said tightening screw arranged to contact the obliquely extending portion of said contact surface.

12. Vibration damper arrangement, as set forth in claim 1, wherein said fastening device comprises a screw connection member secured to one end of said vibration damper and bearing against said receptacle.

13. Vibration damper arrangement, as set forth in claim 1, wherein said tube comprises a cylinder tube of said vibration damper.

14. Vibration damper arrangement, as set forth in claim 1, wherein said vibration damper comprises a double tube vibration damper and said double tube vibration damper comprising a cylinder tube and said tube forming a housing tube laterally enclosing said cylinder tube.

15. Vibration damper arrangement, as set forth in claim 1, wherein said vibration damper includes a piston rod, said tube comprises a guide tube rigidly connected to said piston rod and laterally enclosing said piston rod.

16. Vibration damper arrangement, as set forth in claim 15, wherein said vibration damper includes a cylinder tube located radially inwardly from said guide tube, and at least one guide sleeve concentric with the axis of said vibration damper and located between said cylinder tube and said guide tube.

17. Vibration damper arrangement, as set forth in claim 1, wherein said support for said vibration damper comprises a pivot bearing.

18. Vibration damper arrangement, as set forth in claim 1, wherein said vibration damper arrangement comprises a compression strut.

19. Vibration damper arrangement, as set forth in claim 1, wherein said second stop surface is located at the axial end of said receptacle more distant from said fastening device.

20. Vibration damper arrangement for a vehicle comprising an axially extending damper of the piston rod-cylinder type having a pair of opposite ends spaced apart in the axial direction thereof and including a cylinder tube having the axis thereof extending in the axial direction of said vibration damper, a support for said vibration damper, said support including a hollow receptacle, said tube being insertable into said receptacle, a detachable fastening device engageable at one end of said damper for securing said damper in said receptacle, wherein the improvement comprises that said fastening device applies a tension force through one end of said vibration damper with the force acting in the axial direction of and applying a tension force to said tube, a first stop surface located on said tube spaced at a distance from both ends of said tube, a second stop surface located on said receptacle at a location thereon remote from said fastening device and in cooperating relation with said first stop surface so that under the applied tension action of said fastening device said first stop surface presses against said second stop surface, at least one of said first and second stop surfaces extends obliquely of the axis of said tube and said receptacle has an open axial end located between and spaced axially from the ends of said tube, said fastening device being located at the other end of said receptacle, whereby when said fastening device is detached said damper can be removed in its axial direction out of the open end of said receptacle.

21. Vibration damper arrangement, as set forth in claim 20, wherein said hollow receptacle is cylindrically shaped and has an axis, and the axis of said receptacle extends in the axial direction of said tube.

22. Vibration damper arrangement, as set forth in claim 21, wherein said vibration damper comprises a double tube vibration damper and said double tube vibration damper comprises a cylinder tube and said tube forming a housing tube laterally enclosing said cylinder tube.

23. Vibration damper arrangement, as set forth in claim 21, wherein said vibration damper arrangement comprises a compression strut.

24. Vibration damper arrangement, as set forth in claim 20, wherein at least one of said stop surfaces having a conically shaped peripheral surface thereon arranged to engage a peripheral surface on the other said stop surface.

25. Vibration damper arrangement, as set forth in claim 24, wherein said first stop surface includes an annular radially outwardly facing conical surface, and said second stop surface comprises an annular radially inwardly facing conical surface formed complementary to said radially outwardly facing conical surface.

26. Vibration damper arrangement, as set forth in claim 24 or 25, wherein said first stop surface comprises a conically shaped ring rigidly secured to said tube.

27. Vibration damper arrangement, as set forth in claim 25, wherein said first stop surface comprises a conically shaped ring mounted on said tube, at least one stop formed on said tube and securing said conically shaped ring thereon for preventing sliding displacement of said conically shaped ring in the axial direction of said vibration damper toward the end thereof opposite said fastening device.

28. Vibration damper arrangement, as set forth in claim 27, wherein said conically shaped ring being slotted in the direction extending in the axial direction of said vibration damper.

29. Vibration damper arrangement, as set forth in claim 20, wherein at least one of said first and second stop surfaces is formed by at least one projection extending from at least a portion of the peripheral surface thereof and arranged to be disposed in contact with the other one of said first and second stop surfaces when a tension force is applied by said fastening device.

30. Vibration damper arrangement, as set forth in claim 29, wherein the surface of said at least one projection contacting the other one of said first and second stop surfaces is conically shaped.

31. Vibration damper arrangement, as set forth in claim 29 or 30, wherein said at least one projection is formed by displacing the wall of said tube radially outwardly.

32. Vibration damper arrangement, as set forth in claim 31, wherein said at least one projection has an oblong construction in the direction of the axis of said tube and the radially outer surfaces of said projection form a circular arc in section transverse to the axial direction of said tube.

33. Vibration damper arrangement, as set forth in claim 20, wherein said fastening device comprises at least one tightening screw extending radially outwardly relative to the axis of said vibration damper, a contact surface located on the peripheral surface of said tube extending around said axis of said vibration damper and located adjacent one end of said vibration damper, at least a portion of said contact surface extending obliquely relative to the axis of said tube, and said tightening screw arranged to contact the obliquely extending portion of said contact surface.

34. Vibration damper arrangement, as set forth in claim 33, wherein said fastening device comprises a screw connection member secured to one end of said vibration member and bearing against said receptacle.

35. Vibration damper arrangement, as set forth in claim 20, wherein said vibration damper includes a piston rod, said tube comprising a guide tube rigidly connected to said piston rod and laterally enclosing said piston rod.

36. Vibration damper arrangement, as set forth in claim 35, wherein said vibration damper includes a cylinder tube located radially inwardly from said guide tube, and at least one guide sleeve concentric with the axis of said vibration damper and located between said cylinder tube and said guide tube.

37. Vibration damper arrangement, as set forth in claim 20, wherein said support for said vibration tube comprises a pivot bearing.

38. Vibration damper arrangement, as set forth in claim 20, wherein said receptacle comprises a pivot bearing extending transversely of the axis of said tube.

39. Vibration damper arrangement, as set forth in claim 38, wherein said pivot bearing has a first part located intermediate the ends of said tube and a second part located adjacent said fastening device, said second stop surface located in said first part and said detachable fastening device extending through said second part.

* * * * *